United States Patent
Donaghue, Jr.

(10) Patent No.: US 6,226,377 B1
(45) Date of Patent: May 1, 2001

(54) PRIORITIZED TRANSACTION SERVER ALLOCATION

(75) Inventor: Norman J. Donaghue, Jr., Renton, WA (US)

(73) Assignee: Avaya Technology Corp., Basking Ridge, NJ (US)

(*) Notice: Subject to any disclaimer, the term of this patent is extended or adjusted under 35 U.S.C. 154(b) by 0 days.

(21) Appl. No.: 09/089,848

(22) Filed: Jun. 3, 1998

Related U.S. Application Data
(60) Provisional application No. 60/077,157, filed on Mar. 6, 1998.

(51) Int. Cl.[7] .................................. H04M 5/00; G06F 9/00
(52) U.S. Cl. ........................ 379/265; 379/266; 709/101; 709/201
(58) Field of Search ............................. 379/265, 266, 379/309, 201, 207, 219; 709/1, 100, 101, 404, 105, 201, 202, 203, 223, 226

(56) References Cited

U.S. PATENT DOCUMENTS

| | | | |
|---|---|---|---|
| 5,185,780 | * 2/1993 | Leggett | 379/34 |
| 5,289,368 | * 2/1994 | Jordan et al. | 705/8 |
| 5,325,292 | * 6/1994 | Crockett | 705/9 |
| 5,473,773 | 12/1995 | Aman et al. | 395/650 |
| 5,504,894 | 4/1996 | Ferguson et al. | 395/650 |
| 5,537,542 | * 7/1996 | Eilert et al. | 709/201 |
| 5,603,029 | * 2/1997 | Aman et al. | 709/105 |
| 5,655,120 | * 8/1997 | Witte et al. | 379/309 |
| 5,675,739 | * 10/1997 | Eilert et al. | 709/226 |
| 5,911,134 | * 6/1999 | Castonguay et al. | 705/9 |
| 5,974,462 | * 10/1999 | Aman et al. | 709/225 |

\* cited by examiner

*Primary Examiner*—Ahmad Matar
*Assistant Examiner*—Benny Q. Tieu

(57) ABSTRACT

A facility for distributing transaction servers to process transactions of a number of different types is provided. The transaction types are organized into two or more priority levels ordered from highest to lowest. Each priority level has one or more transaction types. In the facility, a service level goal attribution system attributes a service level goal to each transaction type reflecting the level of service sought for transactions of the transaction type. An identification subsystem identifies transaction servers when they become available to process transactions. In response to each transaction server identified by the identification subsystem, a transaction server distribution subsystem assigns the identified transaction server to process a transaction of a type that needs an additional transaction server to meet its service level goal, and whose priority level is at least as high as that of any other transaction types that need an additional transaction server to meet its service level goal. When the assigned transaction servers complete processing of the transactions to which they are assigned, the identification subsystem reidentifies these transaction servers as again being available to process transactions.

43 Claims, 9 Drawing Sheets

| application number | priority level | transaction type/application | service level goal | | service level goal type |
|---|---|---|---|---|---|
| | | | performance criterion | minimum frequency | |
| 1 | 1 | incoming platinum calls | assign within 15 seconds | 90% of transactions | transaction assignment |
| 2 | 2 | incoming gold calls | assign within 60 seconds | 90% of transactions | transaction assignment |
| 3 | 2 | credit check | complete within 4 days | 80% of transactions | transaction completion |
| 4 | 3 | outgoing card offer calls | complete 200 transactions per day | 75% of days | transaction completion |
| 5 | 3 | outgoing brochures | complete within 4 days | 70% of transactions | transaction completion |
| 6 | 3 | responses to incoming letters | complete within 7 days | 75% of transactions | transaction completion |
| 7 | 100 | at-desk break | accept all offered agents | | none |

*Fig. 2*

PRIORITIZED TRANSACTION SERVER ALLOCATION

CROSS-REFERENCE TO RELATED APPLICATION

This application claims priority from U.S. Provisional Application Ser. No. 60/077,157, filed Mar. 6, 1998, which application is incorporated by reference in its entirety.

TECHNICAL FIELD

The present invention relates generally to the field of allocating transaction server resources and, in particular, to allocating transaction servers in telephonic call centers.

BACKGROUND OF THE INVENTION

A call center is a facility for receiving and/or placing large volumes of telephone calls. The calls are received and placed by call servers, such as human agents or automatic response units. Such call centers typically include an automatic call distributor for assigning each incoming call to a call server. Call centers also typically include a predictive dialer for placing outgoing calls that, if answered, are each assigned to a call server.

In some call centers, agents are also assigned to non-call tasks, such as filling out forms, writing letters, or running credit checks. Call centers in which agents are also assigned to non-call tasks are also called service centers. Assignment of these non-call tasks is generally accomplished manually or handled by a workflow system that is distinct from the automatic call distributor or predictive dialer that assigns phone calls to agents.

Conventionally, the automatic call distributor, the predictive dialer, and the workflow system operate independently to assign calls and non-call tasks, respectively, to agents. To accommodate the independence between these two components, a call center supervisor generally manually divides agent resources between calls and non-call tasks in a static, predetermined manner. For example, a first group of agents may be dedicated to conducting calls, while a second, distinct group of agents is dedicated to performing non-call tasks. As another example, certain agents may be dedicated to conducting calls every morning, and dedicated to performing non-call tasks every afternoon.

Such call centers usually succeed in making a certain amount of progress in handling both calls and non-call tasks. Depending on the aptness of the manual division of agent resources and the particular pattern of calls and non-call tasks experienced, however, unacceptable levels of service are often obtained for either calls, non-call tasks, or both. In cases in which it is essential to ensure high levels of service, it is often necessary for call center supervisors to overstaff the pool of agents, at significant cost.

Based on these disadvantages of conventional call centers, which are shared by similar transaction processing systems of several other types, a facility for more effectively managing call server resources and other transaction server resources would have significant utility.

SUMMARY OF THE INVENTION

The present invention provides a facility for allocating transaction servers ("servers") in a transaction processing system in a manner that facilitates differentiation between transactions of different priorities and balancing the performance of transactions of the same priority. Within the constraints imposed by the availability of servers, the facility facilitates maintaining pre-defined service level goals. For example, the facility may allocate telephone call processing servers, such as human operators/agents and automatic response units, for processing telephone calls. The facility can also allocate servers to process virtually any other type of transaction, including, but not limited to, form processing; response to world wide web hits ("web hits"); letter, fax, or email generation or response; account adjustment; and various forms of network and Internet communication. The facility can allocate servers between several different types of transactions. Transactions may be initiated within the organization using the facility, by external customers or clients of the organization, or both.

In a preferred embodiment, the facility allocates servers among different applications each of which processes transactions of a different type or of the same type but with a different service level goal. For example, a first application may process incoming telephone call transactions for platinum credit card holders, a second application may process outgoing telephone call transactions for new credit card offers, and a third application may process credit check transactions, such as those received via the world wide web or in the mail, and a fourth application that responds to web hits with outgoing phone calls.

The facility preferably enables a service level goal to be specified for each application, indicating the level of performance sought in processing transactions of the application's type. Service level goals are generally each comprised of two components: a performance criterion specifying an amount of time by which some action relating to the transaction is to be completed, and a minimum frequency indicating the percentage of transactions for which the criterion is to be satisfied. As an example, one service level goal may specify a criterion of assigning transaction within 15 seconds of their receipt, and a minimum frequency that indicates that 90% of the transactions are to be processed in accordance with the performance criterion. Performance criteria ("criteria") may be of various types, including transaction assignment criteria and transaction completion criteria. Transaction assignment criteria relate to the amount of time that it takes for a server to be assigned to transactions after they arrive. A transaction assignment criterion may indicate, for example, that incoming telephone call transactions for platinum credit card holders are to be assigned to a server within 15 seconds of their arrival. Transaction assignment criteria are particularly well adapted to transactions initiated outside the organization using a real-time medium, such as an incoming telephone call or web hit—especially those transactions initiated by a human client. Such transactions are regarded as "volatile," as they may be lost if not quickly assigned to a server. For example, if an incoming telephone call is not answered within a few seconds after it is initiated, the caller may hang up and end the call.

Transaction completion criteria, on the other hand, relate to the amount of time that it takes to complete the processing of transactions. A transaction completion criterion may indicate, for example, that credit check transactions are to be completed within 4 days of their arrival, or that outgoing telephone call transactions for new credit card offers are to be completed at the rate of 200 per day. Transaction completion criteria are particularly well adapted to transactions initiated outside the organization using a non-real-time medium, such as incoming letters, or transactions that are initiated from inside the organization, such as outgoing telephone calls or are generated as a follow on to a transaction assignment transaction, such as a telephone call requesting a loan. Servicing the telephone call involves a transaction assignment criterion (such as answering all customer telephone calls within 20 seconds) but generating the loan application that results involves satisfying a transaction completion criterion (such as processing all loan applications within 4 business days).

In addition to specifying a performance criterion, a service level goal may also indicate a minimum percentage of times, or "minimum frequency," that the performance criterion is to be satisfied. For example, a transaction assignment service level goal may indicate that at least 90% of incoming telephone call transactions for platinum credit card holders are to be assigned to a server within 15 seconds of their arrival.

In addition to a service level goal, each application preferably also has a priority level, indicating the importance of satisfying the service level goal of that application relative to the importance of satisfying the service level goals of the other applications. For example, incoming telephone call transactions for platinum credit card holders may have a priority level of 1 (indicating the highest priority), incoming telephone call transactions for gold credit card holders may have a priority level of 2, and outgoing telephone call transactions for new credit card offers may have a priority level of 3. Multiple applications may have the same priority level.

In contrast to conventional transaction processing systems that attempt to assign each newly-arrived transaction to a server, the facility of the present invention assigns each newly-available server to a transaction. Such assignment takes place each time a server becomes available, either when an existing server completes the processing of the last transaction that it was assigned to process, or when a new server arrives. The assignment process involves "offering" use of the server for use by each priority level of applications in sequence, from the highest priority level to the lowest priority level, until a priority level accepts use of the server. To determine whether to accept the offered server, each priority level in turn offers the server to each application of that priority level, until an application accepts use of the server. If any application at that priority level accepts use of the server, then the priority level accepts the use of the server. On the other hand, if none of the applications at that priority level accepts use of the server, then the priority level declines the use of the server, and the facility offers use of the server to the next lower priority level. By offering each available server in accordance with the priority levels, the facility ensures that at least applications in the highest priority levels will successfully reach their service level goals. Where adequate numbers of servers are available, however, the facility permits applications in all priority levels to reach their service level goals.

Within a single priority level, the facility offers use of the server to the applications of the priority level in a certain sequence. In cases in which the server is needed by more than one application in the current priority level, this sequence determines which of these applications is able to use the server. The facility therefore establishes the sequence in a manner that is fair to all of the applications of the priority level. As one example, the facility may use a round-robin approach for establishing this order, beginning with an initial random order and, for each offer, rotating the order one position in a consistent direction. In this way, each application of the priority level has equal opportunity to accept servers offered to the priority level. As another example, the facility may assess the success of each application at reaching its service level goals, and establish a sequence that favors the applications that are the furthest from reaching their service level goals. In this way, the facility exerts a balancing force on the applications of the priority level, enabling underperforming applications to receive extra servers that can be used to improve the performance of these applications.

When the facility offers a server to a particular application, the application preferably determines whether it should accept the offered server based on whether the offered server is needed by the application to meet its service level goal. The facility may make this determination either on a "closed-loop" basis, in which the facility uses the current achieved service level of the application to make the determination, or on an "open-loop" basis, in which the facility uses information other than the current achieved service level of the application.

For the closed loop basis, the facility compares the current achieved service level with the pre-defined service level goal to make the determination. If the offered server is not required for achievement of the predetermined service level goals, then the server is not accepted. If the offered server is required to achieve the predetermined service level goal, then the server is accepted.

For the open-loop basis, the facility may use a preestablished model, formula, or table to determine whether an offered server is needed by the application to meet its service level goal using current operating parameters of the application, such as transaction arrival rate, number of uninitiated transactions, wait times of uninitiated transactions, transaction service completion rate, and transaction service completion time.

When the application accepts the offered server, if any transactions are waiting for processing, the accepted server is assigned to process one of the waiting transactions. On the other hand, if no transactions are waiting when the application accepts the server, the accepted server is maintained in an idle/reserved server queue until a new transaction arrives. When a new transaction subsequently arrives, a server in the idle/reserved server queue is assigned to process the new transaction. By maintaining one or more servers in its idle/reserved server queue, that is, by accepting a server or servers even when its transaction queue is empty, an application can ensure that a server will be immediately assigned to the next arriving transaction. In this way, the application is able to exert control over its achieved service level.

BRIEF DESCRIPTION OF THE DRAWINGS

FIG. 2 is a table diagram identifying a number of sample transaction types.

DETAILED DESCRIPTION OF THE INVENTION

Figure 1:
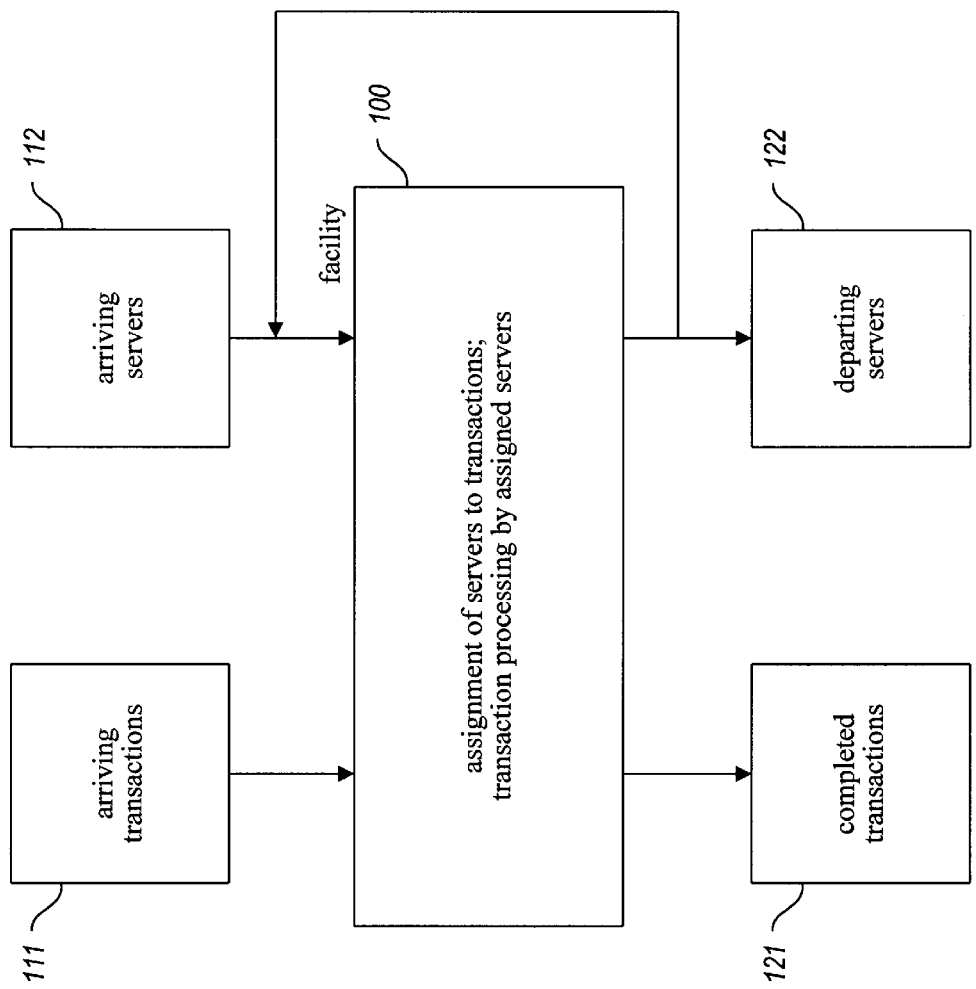
FIG. 1 is a conceptual diagram showing the relationship between the facility, transactions, and servers.

The present invention provides a facility for allocating transaction servers ("servers") in a transaction processing system in a manner that facilitates differentiation between transactions of different priorities and balancing the performance of transactions of the same priority. Within the constraints imposed by the availability of servers, the facility facilitates maintaining pre-defined service level goals. For example, the facility may allocate telephone call processing servers, such as human operators/agents and automatic response units, for processing telephone calls. The facility can also allocate servers to process virtually any other type of transaction, including, but not limited to, form processing; response to world wide web hits ("web hits"); letter, fax, or email generation or response; account adjustment; and various forms of network and Internet communication. The facility can allocate servers between several different types of transactions. Transactions may be initiated within the organization using the facility, by external customers or clients of the organization, or both.

In a preferred embodiment, the facility allocates servers among different applications, each of which processes transactions of a different type or of the same type but with a different service level goal. For example, a first application may process incoming telephone call transactions for platinum credit card holders, a second application may process outgoing telephone call transactions for new credit card offers, and a third application may process credit check transactions, such as those received via the world wide web or in the mail, and a fourth application that responds to web hits with outgoing phone calls.

The facility preferably enables a service level goal to be specified for each application, indicating the level of performance sought in processing transactions of the application's type. Service level goals are generally each comprised of two components: a performance criterion specifying an amount of time by which some action relating to the transaction is to be completed, and a minimum frequency indicating the percentage of transactions for which the criterion is to be satisfied. As an example, one service level goal may specify a criterion of assigning transaction within 15 seconds of their receipt, and a minimum frequency that indicates that 90% of the transactions are to be processed in accordance with the performance criterion. Performance criteria ("criteria") may be of various types, including transaction assignment criteria and transaction completion criteria. Transaction assignment service level goals relate to the amount of time that it takes for a server to be assigned to transactions after they arrive. A transaction assignment criterion may indicate, for example, that incoming telephone call transactions for platinum credit card holders are to be assigned to a server within 15 seconds of their arrival. Transaction assignment criteria are particularly well adapted to transactions initiated outside the organization using a real-time medium, such as an incoming telephone call or web hit specially those transactions initiated by a human client. Such transactions are regarded as "volatile," as they may be lost if not quickly assigned to a server. For example, if an incoming telephone call is not answered within a few seconds after it is initiated, the caller may hang up and end the call.

Transaction completion criteria, on the other hand, relate to the amount of time that it takes to complete the processing of transactions. A transaction completion criterion may indicate, for example, that credit check transactions are to be completed within 4 days of their arrival, or that outgoing telephone call transactions for new credit card offers are to be completed at the rate of 200 per day. Transaction completion criteria are particularly well adapted to transactions initiated outside the organization using a non-real-time medium, such as incoming letters, or transactions that are initiated from inside the organization, such as outgoing telephone calls or are generated as a follow on to a transaction assignment transaction, such as a telephone call requesting a loan. Servicing the telephone call involves a transaction assignment criterion (such as answering all customer telephone calls within 20 seconds) but generating the loan application that results involves satisfying a transaction completion criterion (such as processing all loan applications within 4 business days).

In addition to specifying a performance criterion, service level goals may also indicate a minimum percentage of times, or "minimum frequency," that the performance criterion is to be satisfied. For example, a transaction assignment service level goal may indicate that at least 90% of incoming telephone call transactions for platinum credit card holders are to be assigned to a server within 15 seconds of their arrival.

In addition to a service level goal, each application preferably also has a priority level, indicating the importance of satisfying the service level goal of that application relative to the importance of satisfying the service level goals of the other applications. For example, incoming telephone call transactions for platinum credit card holders may have a priority level of 1 (indicating the highest priority), incoming telephone call transactions for gold credit card holders may have a priority level of 2, and outgoing telephone call transactions for new credit card offers may have a priority level of 3. Multiple applications may have the same priority level.

In contrast to conventional transaction processing systems that attempt to assign each newly-arrived transaction to a server, the facility of the present invention assigns each newly-available server to a transaction. Such assignment takes place each time a server becomes available, either when an existing server completes the processing of the last transaction that it was assigned to process, or when a new server arrives. The assignment process involves "offering" use of the server for use by each priority level of applications in sequence, from the highest priority level to the lowest priority level, until a priority level accepts use of the server. To determine whether to accept the offered server, each priority level in turn offers the server to each application of that priority level, until an application accepts use of the server. If any application at that priority level accepts use of the server, then the priority level accepts the use of the server. On the other hand, if none of the applications at that priority level accepts use of the server, then the priority level declines the use of the server, and the facility offers use of the server to the next lower priority level. By offering each available server in accordance with the priority levels, the facility ensures that at least applications in the highest priority levels will successfully reach their service level goals. Where adequate numbers of servers are available, however, the facility permits applications in all priority levels to reach their service level goals.

Within a single priority level, the facility offers use of the server to the applications of the priority level in a certain sequence. In cases in which the server is needed by more than one application in the current priority level, this sequence determines which of these applications is able to use the server. The facility therefore establishes the sequence in a manner that is fair to all of the applications of the priority level. As one example, the facility may use a round-robin approach for establishing this order, beginning with an initial random order and, for each offer, rotating the order one position in a consistent direction. In this way, each application of the priority level has equal opportunity to accept servers offered to the priority level. As another example, the facility may assess the success of each application at reaching its service level goals, and establish a sequence that favors the applications that are the furthest from reaching their service level goals. In this way, the facility exerts a balancing force on the applications of the priority level, enabling underperforming applications to receive extra servers that can be used to improve the performance of these applications.

When the facility offers a server to a particular application, the application preferably determines whether it should accept the offered server based on whether the offered server is needed by the application to meet its service level goal. The facility may make this determination either on a "closed-loop" basis, in which the facility uses the current achieved service level of the application to make the determination, or on an "open-loop" basis, in which the facility uses information other than the current achieved service level of the application.

For the closed loop basis, the facility compares the current achieved service level with the pre-determined service level goal to make the determination. If the offered server is not required for achievement of the predetermined service level goal, then the server is not accepted. If the offered server is required to achieve the predetermined service level goal, then the server is accepted.

For the open-loop basis, the facility may use a preestablished model, formula, or table to determine whether an offered server is needed by the application to meet its service level goal using current operating parameters of the application, such as transaction arrival rate, number of uninitiated transactions, wait times of uninitiated transactions, transaction service completion rate, and transaction service completion time.

When the application accepts the offered server, if any transactions are waiting for processing, the accepted server is assigned to process one of the waiting transactions. On the other hand, if no transactions are waiting when the application accepts the server, the accepted server is maintained in a reserved/idle server queue until a new transaction arrives. When a new transaction subsequently arrives, a server in the reserved/idle server queue is assigned to process the new transaction. By maintaining one or more servers in its reserved/idle server queue, that is, by accepting a server or servers even when its transaction queue is empty, an application can ensure that a server will be immediately assigned to the next arriving transaction. In this way, the application is able to exert control over its achieved service level.

FIG. 1 is a conceptual diagram showing the relationship between the facility, transactions, and servers. It can be seen from FIG. 1 that the facility 100 receives arriving transactions 111, such as telephone calls or web hits, and arriving servers 112, such as servers like human agents, automatic telephone response units, and/or automated web servers. Servers may arrive because they have just become available ("logged on" or "gone online"), or because they have completed servicing a transaction and are available for reassignment. The facility 100 assigns each arriving server to a particular transaction, such that an assigned server processes the transaction to which it is assigned. After the processing of a particular assignment by a server is completed, the facility 100 produces a completed transaction 121. The server assigned to process the completed transaction may exit the facility as a departing server 122. For example, human agents may leave their workstations for a break or at the end of the workday, while automatic response units may be deactivated for service or replacement. If the server does not leave the facility, however, it becomes a new arriving server 112, which is reassigned by the facility to a new transaction.

FIG. 2 is a table diagram identifying a number of sample transaction types. Each row of the table 200 corresponds to a different transaction type and application for processing transactions of that type, and indicates an application number 201 uniquely identifying an application, a priority level 202, a transaction type 203 of the application, a service level goal 204, and a service level goal type 205. Each service level goal 204 is in turn made up of a performance criterion 206 and a minimum frequency 207. For example, row 221 of table 200 indicates that incoming calls from gold card customers have a priority level of 2. Their service level goal is to assign transactions within 60 seconds of their arrival (their performance criterion) for 90% of the transactions (their minimum frequency). This is a transaction assignment service level goal. Row 241 differs somewhat from the other rows, in that it represents a default activity for servers that are not needed for any application. As such, it has a service level goal type of "none." When a server becomes available, the facility preferably offers the server first to the priority level 1 application identified in row 211, then to the priority level 2 applications identified in rows 221 and 222, then to the priority level 3 applications identified in rows 231–233, then to the priority level 100 application identified in row 241, until the offered server is accepted.

Figure 3:
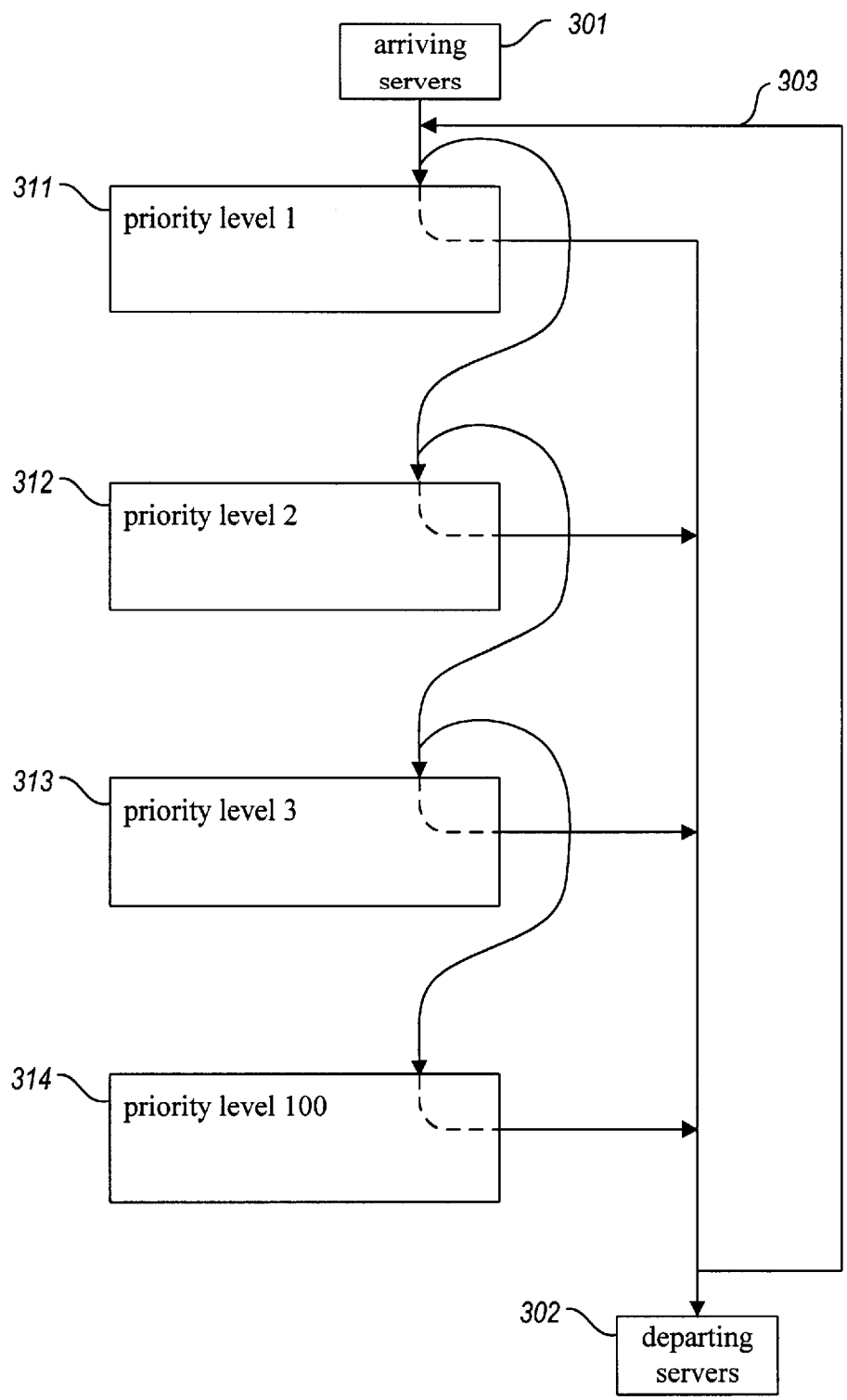
FIG. 3 is a conceptual diagram showing the facility's approach to assigning available servers to the priority levels identified in FIG. 3.

FIG. 3 is a conceptual diagram showing the facility's approach to assigning available servers to the priority levels identified in FIG. 2. In FIG. 3, when each arriving server 301 becomes available to the facility, the facility offers the arriving server to one priority level after another until one of the priority levels accepts the offered server. The facility begins by offering the server to the highest priority level, that is, the priority level having the smallest number. In the example, highest priority level is 1. Priority level 1 (311) determines whether the offered server is needed to meet the service level goal of any of its applications. If so, priority level 1 accepts the offered server, and assigns it to one of its applications (discussed in greater detail below), which uses it to process an arriving transaction. After such processing is complete, the application outputs the completed transaction, and releases the server. At this point, the server may join the departing servers 302 that are no longer available to process transactions, or may follow route 303 to reenter the facility as an arriving server.

If priority level 1 does not accept the offered server, the facility next offers the server to priority level 2 (312). Again, if priority level 2 accepts the server, then one of the applications in priority level 2 uses the server to process one of its arriving transactions, and then that application releases the server for departure or reassignment. If priority level 2 does not accept the offered server, then the facility offers the server to priority level 3 (313).

If, after offering the server to priority levels 1–3, the server has not been accepted, the facility preferably offers the application to priority level 100 (314). Priority level 100 has a minimum priority, and contains a single "background" application, which always has transactions available. This background application is preferably provided to accept any offered servers that are not accepted by applications in higher priority levels. As the net result of this process, the server is accepted and used by exactly one of the four priority levels, then released either to depart or to be reassigned.

Figure 4:
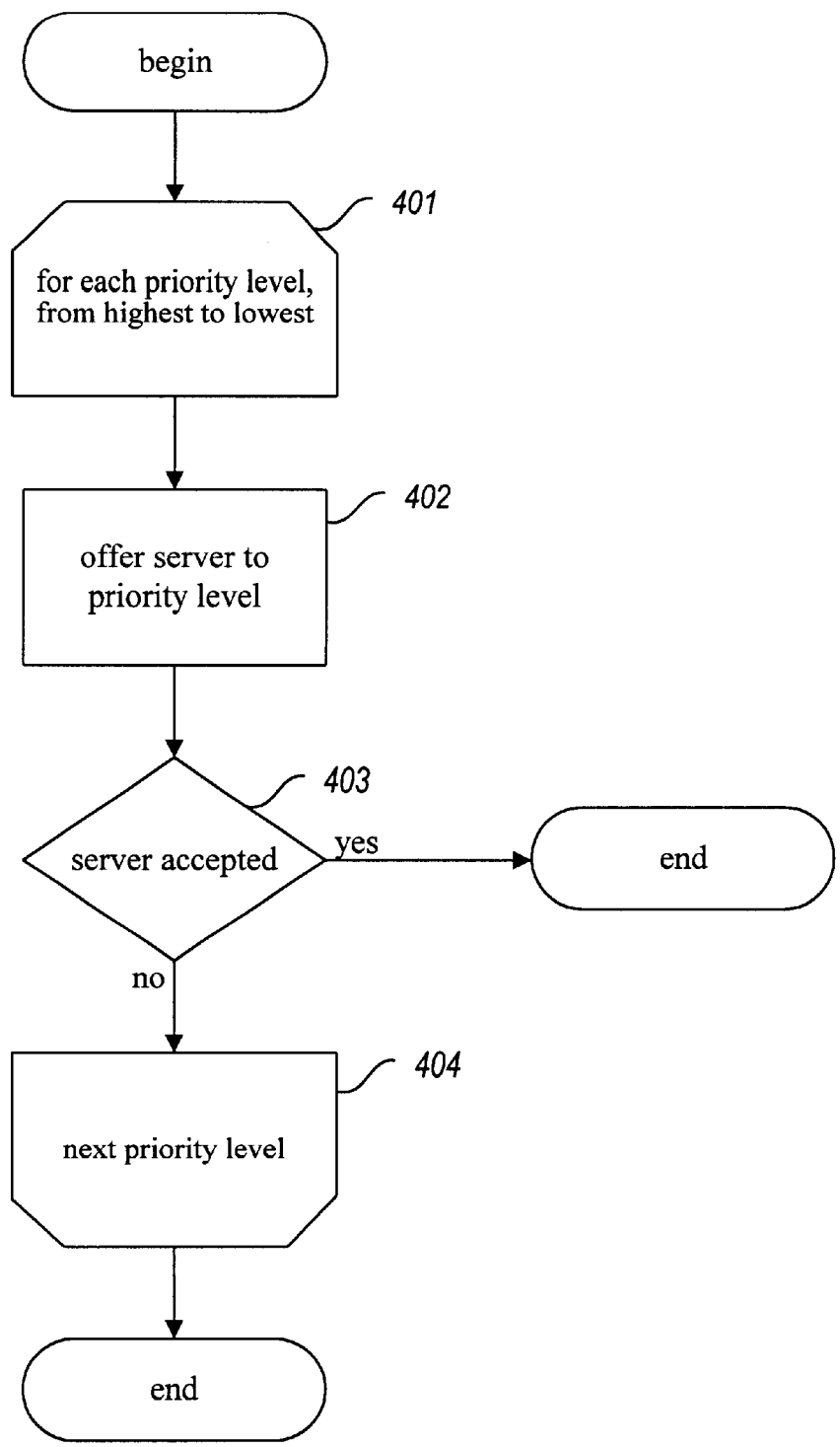
FIG. 4 is a flow diagram showing the steps preferably performed by the facility in order to assign an available server to one of the priority levels.

FIG. 4 is a flow diagram showing the steps preferably performed by the facility in order to assign an available server to one of the priority levels. In steps 401–404, the facility loops through each defined priority level, from the highest priority level to the lowest. In terms of the applications identified in FIG. 2, this involves looping through priority levels 1, 2, 3, and 100, in that order. Step 401 marks the beginning of this loop, and step 404 marks its end. In step 402, the facility offers the available server to the current priority level (i.e., level 1 in the first loop through). The details of step 402 are discussed in greater detail below in connection with FIG. 6. In step 403, if, in response to the offer of step 402, the server is accepted by the current priority level, then these steps conclude. If in step 402 the server is not accepted, the facility continues in step 404. In step 404, if additional, lower priority levels remain, then the facility loops back to step 401 to offer the server to the next lower priority level. If no lower priority levels remain, these steps conclude. If no default application is defined for the facility, the facility may loop through all of the priority levels without assigning the available server to any of the priority levels. In this case, the facility preferably repeats these steps at a later time.

Figure 5:
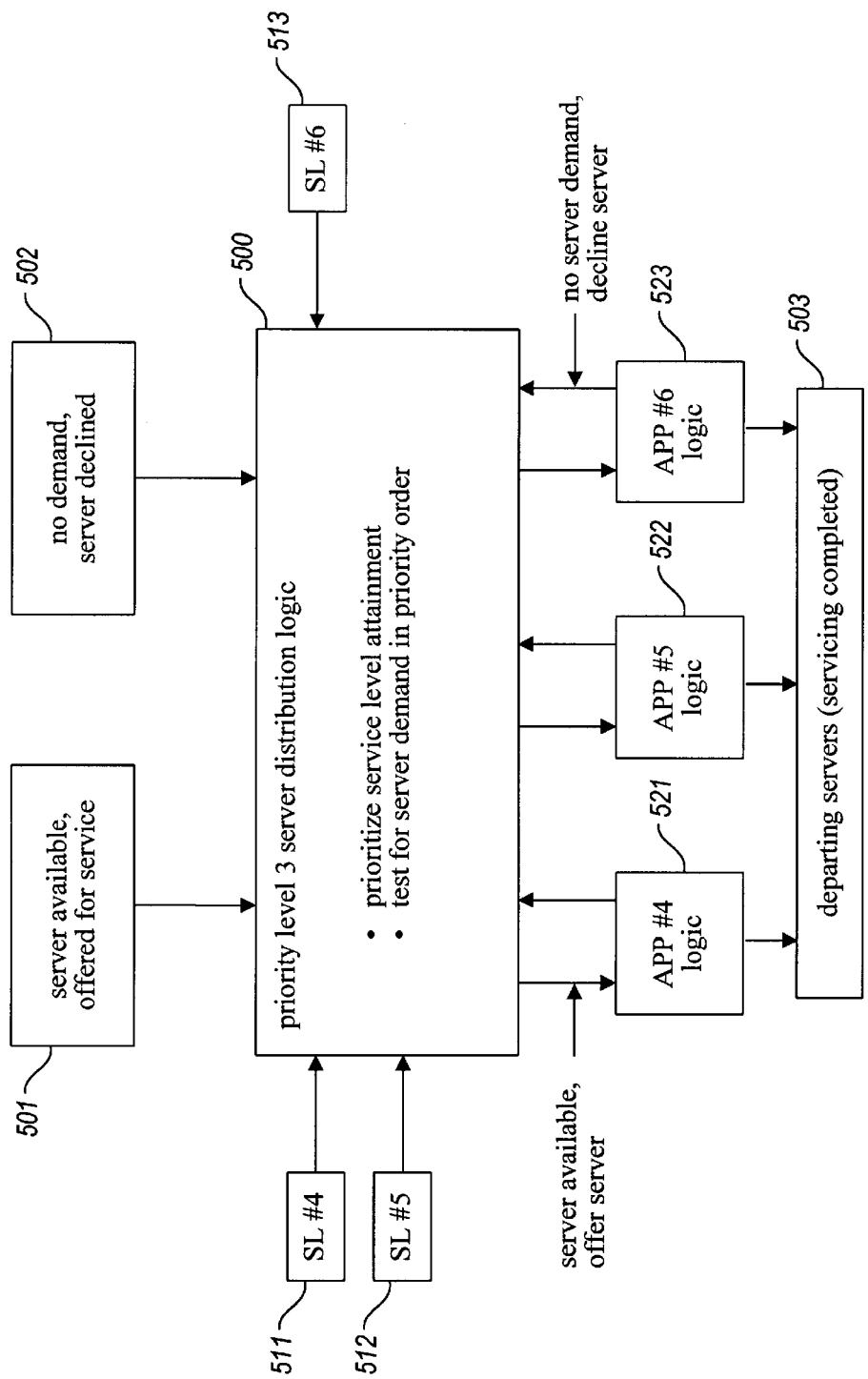
FIG. 5 is a conceptual diagram showing the facility's approach to assigning available servers to the sample applications identified in FIG. 2 within a particular priority level.

FIG. 5 is a conceptual diagram showing the facility's approach to assigning available servers to the sample applications identified in FIG. 2 within a particular priority level. FIG. 5 shows the operation of distribution logic for priority level 3 as identified in the table shown in FIG. 2, containing applications 4, 5, and 6. After an available agent has been offered to priority levels 1 and 2 and declined by both, the available server 501 is offered to priority level 3. In response, the priority level 3 server distribution logic (1) prioritizes the applications in the service level in terms of their need for available servers, then tests for server demand in the applications in that priority order. In prioritizing, the server distribution logic 500 uses indications of the current or expected future service level of each of the applications 511–513. The server distribution logic then offers the available server, in turn, to the three applications in the priority level 521–523 in this order. As discussed below, each application, when it is offered the available server, determines whether the server is needed to meet its service level goal, and if so, accepts the server. If the available server is not needed by the current application to meet its service level goal, the current application declines the available server and the priority level server distribution logic offers it to the next application in the priority order. If the available server is accepted by one of the applications, it is used to process a transaction, then released as a departing server 503. On the other hand, if the available server is not accepted by any of the applications, the server is declined by the priority level 502, and can be offered to the next lower priority level.

Figure 6:
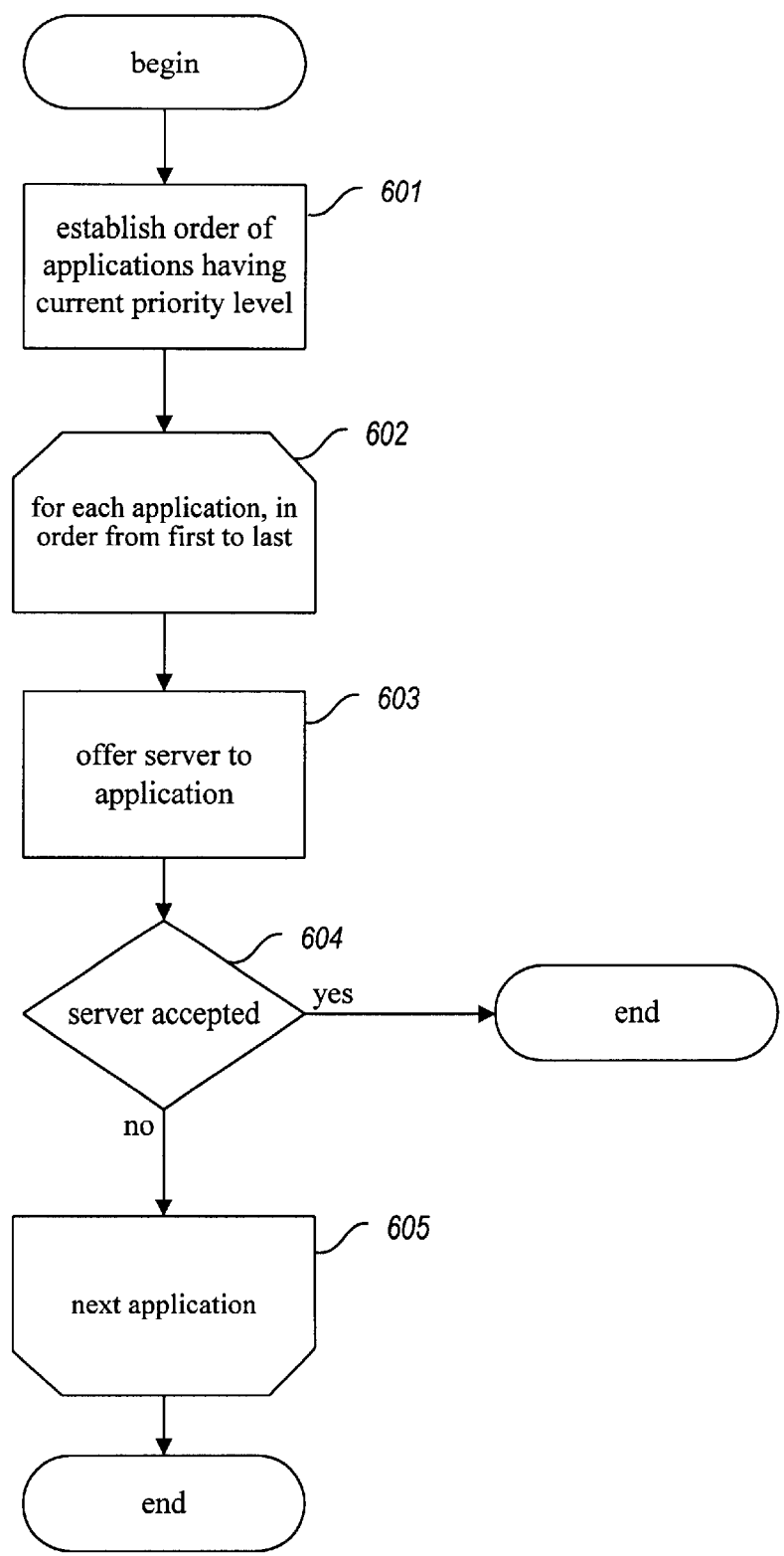
FIG. 6 is a flow diagram showing the steps preferably performed by the facility in order to offer an available server to a particular priority level, as described above for step 402 of FIG. 4.

FIG. 6 is a flow diagram showing the steps preferably performed by the facility in order to offer an available server to a particular priority level, as described above for step 402 of FIG. 4. In step 601, the facility establishes an order for the applications having the current priority level. The facility preferably omits step 601 for priority levels having only one application. In terms of the applications identified in FIG. 2, for priority level 3, the facility would establish an order for the applications identified in rows 231, 232, and 233. In cases in which the server is needed by more than one application in the current priority level, the order established in step 601 determines which of these applications is permitted to use the server. The facility therefore establishes the sequence in a manner that is fair to all of the applications of the current priority level. In one preferred embodiment, the facility uses a round-robin approach for establishing this order, beginning with an initial random order and, for each offer, rotating the order one position in a consistent direction. In this embodiment, each application of the priority level has equal opportunity to accept servers offered to the priority level. In another preferred embodiment, the facility assesses the success of each application at reaching its service level goal, and establishes a sequence that favors the applications that are the furthest from reaching their service level goals. In this embodiment, the facility exerts a balancing force on the applications of the priority level, enabling underperforming applications to receive extra servers that can be used to improve the performance of these applications.

In steps 602–605 of FIG. 6, the facility loops through each application in the order established in step 601. Step 602 marks the beginning of this loop, and step 605 marks its end. In step 603, the facility offers the available server to the current application. The performance of step 603 is discussed in greater detail below in conjunction with FIG. 7. In step 604, if the current application accepts the server in response to the offer of step 603, then these steps conclude. If the current application does not accept the server, the facility continues in step 605. In step 605, if additional applications remain in the established order, then the facility loops back to step 602 to offer the available server to the next application. If no additional applications remain, these steps conclude.

Figure 7:
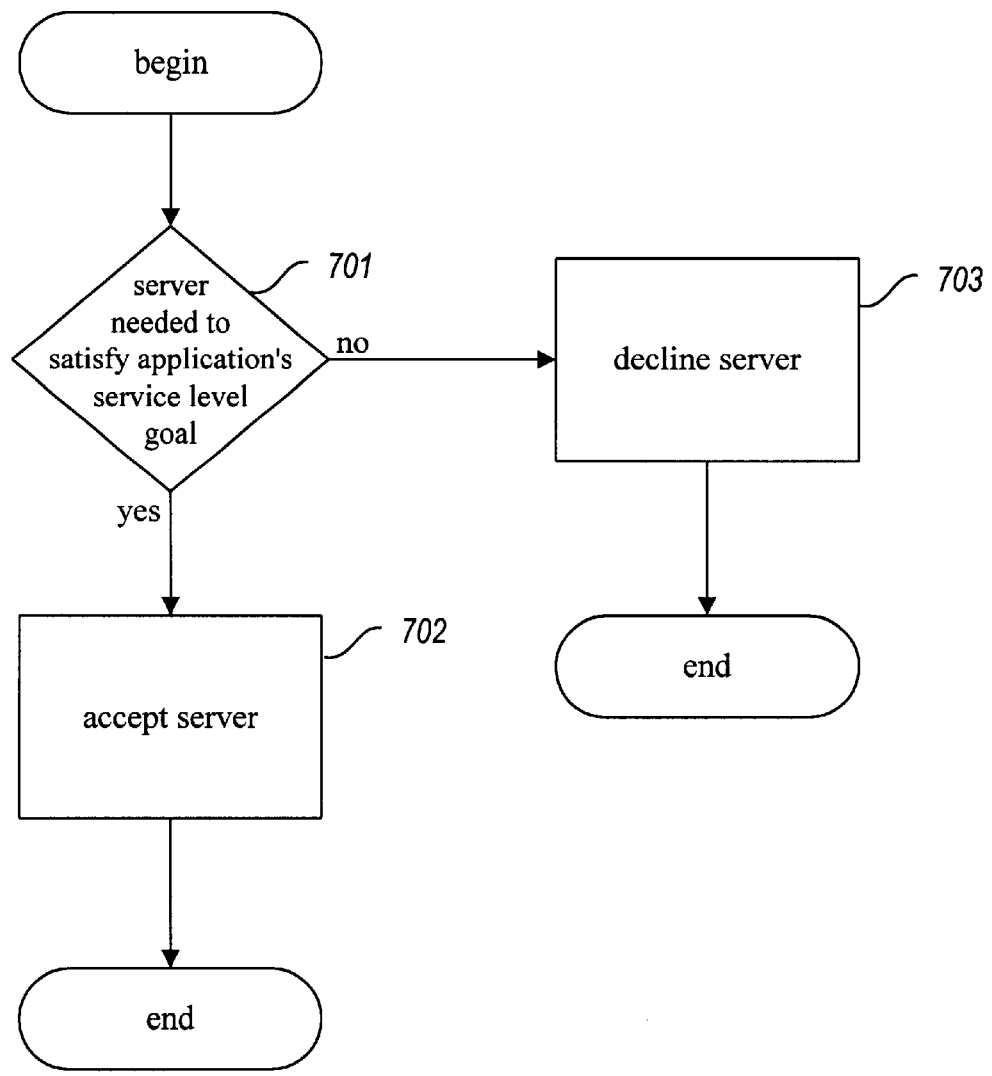
FIG. 7 is a flow diagram showing the steps preferably performed by the facility in order to accept or decline an available server offered to a particular application, as described above for step 603 of FIG. 6.

FIG. 7 is a flow diagram showing the steps preferably performed by the facility in order to accept or decline an available server offered to a particular application, as described above for step 603 of FIG. 6. In step 701, the facility determines whether the server is needed to satisfy the current application's service level goal. In terms of the applications identified in row 221 of FIG. 2, for the incoming gold calls application, the facility determines whether the available server is needed in order to assign incoming gold calls within 60 seconds of their arrival for 90% of such calls. In step 701, if it is determined that the available server is needed to satisfy the current application's service level goal, then the facility continues in step 702. In step 702, the facility accepts the available server to process transactions within the current application. When the application accepts the offered server, if any transactions are waiting for processing the accepted server is assigned to process one of the waiting transactions. On the other hand, if no transactions are waiting when the application accepts the server, the accepted server is maintained in an idle/reserved server queue until a new transaction arrives. When a new transaction arrives, a server in the idle/reserved server queue is assigned to process the new transaction. After step 702, these steps conclude. If in step 701 the available server is not needed, the facility continues in step 703. In step 703, the facility declines to accept the server for the current application, and these steps conclude. In one preferred embodiment, the determination of step 701 is expanded to also include one or more tests (not shown) for the suitability of the available server to the transaction type of the current application. In this embodiment, each individual server has certain qualification standards, which are used as the basis for determining whether a particular server is well-suited to a particular transaction type.

Figure 8:
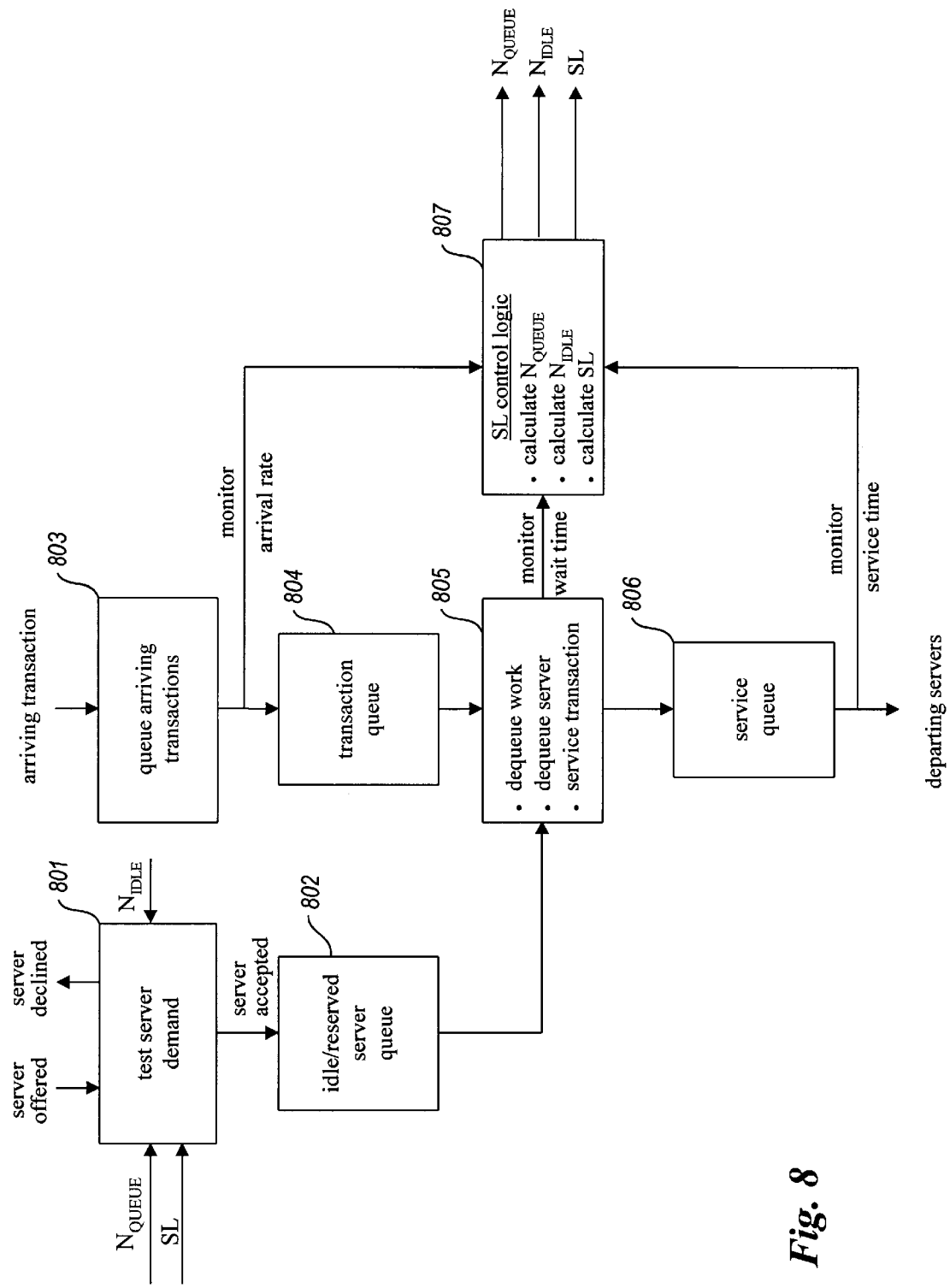
FIG. 8 is a workflow diagram showing the activity performed by the facility with respect to a single application.

FIG. 8 is a workflow diagram showing the activity performed by the facility with respect to a single application. Block 801 shows that a server is offered to the application, and the application either accepts or declines based on such parameters as the current service level ("SL"), the number of transactions waiting in a transaction queue 804 to be assigned ("$N_{QUEUE}$"), and the number of servers waiting to be assigned to a transaction in an idle/reserved server queue 802 ("$N_{IDLE}$"). If the server is accepted, it is added to the idle/reserved server queue 802. Block 803 shows that arriving transactions are queued in a transaction queue 804. The rate at which transactions arrive is monitored by SL control logic 807. As shown by block 805, any time the idle/reserved server queue contains at least one server and the transaction queue contains at least one transaction, a server is removed from the idle/reserved server queue 802, a transaction is removed from the transaction queue 804 and thus the removed server is assigned to process the removed transaction. When a server is assigned to a transaction in this manner, the SL control logic 807 monitors the amount of time the transaction spent in the transaction queue 804. Transactions being processed by servers are shown in block 806. After a server completes the processing of a transaction, the facility preferably reassigns the server in accordance with the steps shown in FIG. 6. Also, when processing of the transaction is completed, the SL control logic 807 monitors the amount of time the server took to process the transaction. The SL control logic 807 calculates statistics relating to the processing of transactions in the application, such as $N_{QUEUE}$, $N_{IDLE}$, and SL, that are used in block 801 to determine whether to accept or decline an offered server.

Figure 9:
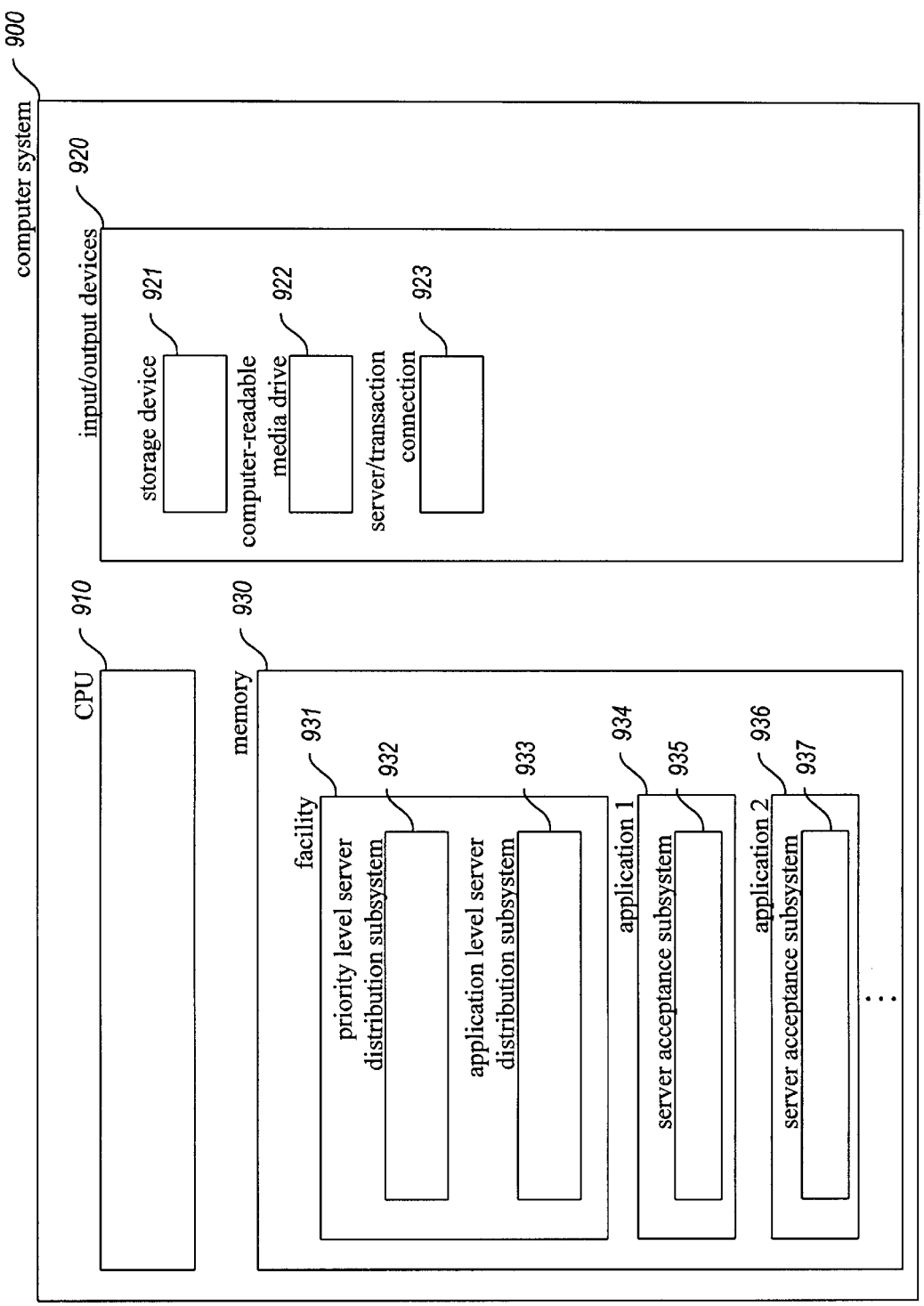
FIG. 9 is a high-level block diagram showing an illustrative computer system upon which the facility of the present invention may operate.

The facility may be implemented on a wide variety of hardware configurations. FIG. 9 is a high-level block diagram showing an illustrative computer system upon which the facility of the present invention may execute. As shown in FIG. 9, the computer system 900 comprises a central processing unit (CPU) 910, input/output devices 920, and a computer memory 930. Among the input/output devices is a storage device 921, such as a hard disk drive; and a computer-readable media drive 922, which can be used to install software products, including the facility, which are provided on a computer-readable medium, such as a CD-ROM. The input/output devices 930 further include a connection 923 to servers and transaction sources from which transactions are received. For example, the connection 923 may be used to connect the computer system to one or more computer telephony interfaces, world wide web servers, or world wide web browsers. This connection is usable by the facility to detect server availability, assign servers to applications and transactions, and monitor the processing of transactions by servers.

The memory 930 contains the facility 931 for distributing servers, which includes a priority level server distribution subsystem 932 whose operation is discussed above in conjunction with FIG. 4, and an application level server distribution subsystem 933 whose operation is discussed above in connection with FIG. 6. In addition to the facility 931, the memory 930 preferably also contains logic for each application, such as application 1 934 and application 2 936. Included for each application is a server acceptance subsystem for determining whether to accept servers offered to the application, such as server acceptance subsystem 935.

While the facility is preferably implemented on a computer system configured as described above, those skilled in the art will recognize that it may also be implemented on computer systems having different configurations. For example, the facility may be implemented on a computer system having different components than described above. Further, the functionality of the computer system 900 may be divided among several different computers in a distributed system. For example, application 1 (934) and application 2 (936) may reside on separate, geographically-distributed hardware configurations interconnected via a communications network. The facility may also be implemented on special-purpose computer systems, such as those in a call center. The facility may further be implemented without software in special-purpose hardware, using, for example, application-specific integrated circuits.

While the present invention has been shown and described with reference to preferred embodiments, it will be understood by those skilled in the art that various changes or modifications in form and detail may be made without departing from the scope of the invention. For example, though described in conjunction with telephone call transactions, the facility may be used to allocate servers for processing virtually any kind of transaction. Further, the facility may maintain additional state information that obviates certain steps of the allocation process described above. Additionally, the facility preferably facilitates the use of service level metrics and service level goal types other than those discussed above.

I claim:

1. A method in a computer system for distributing transaction servers to process transactions of a plurality of different types, the transaction types being organized into a plurality of priority levels ordered from highest to lowest, each priority level having one or more transaction types, each transaction type further having a service level goal reflecting the level of service sought for transactions of the transaction type, the method comprising the steps of:

identifying transaction servers when they become available to process transactions;

for each identified transaction server, in response to the identification of the transaction server:

for each priority level, from the highest priority level to the lowest priority level, until the identified transaction server is assigned to process a transaction of a selected type:

determining whether assigning the identified transaction server to a transaction of any of the transaction types of the priority level is necessary to meet the service level goal for that transaction type;

if it is determined that assigning the identified transaction server to a transaction of any of the transaction types of the priority level is necessary to meet the service level goal for that transaction type, assigning the identified transaction server to process a transaction of one of the transaction types of the priority level; and after the assigned transaction server has completed processing of the transaction to which it was assigned, reidentifying the assigned transaction server as being available to process additional transactions, such that, for transaction types of a higher priority level relative to transaction types of a lower priority level, an available transaction server cannot be assigned to process a transaction of the transaction type of the lower priority level when the service level goal for the transaction type of the higher priority level is not being satisfied, thus ensuring that transaction servers are distributed in a manner that satisfies service level goals for transaction types in order from the transaction types of the highest priority level toward the transaction types of the lowest priority level.

2. The method of claim 1 wherein at least a portion of the transaction types correspond to telephone calls, and wherein the step of identifying a transaction server identifies transaction servers for conducting telephone calls.

3. The method of claim 2 wherein the identifying step identifies human agents.

4. The method of claim 2 wherein the identifying step identifies automatic telephone response units.

5. The method of claim 1 wherein at least a portion of the transaction types correspond to web hits, and wherein the step of identifying a transaction server identifies transaction servers for processing web hits.

6. The method of claim 5 wherein the identifying step identifies human agents.

7. The method of claim 5 wherein the identifying steps identifies automated web servers.

8. The method of claim 1 wherein the determining and assigning steps comprise the steps of:
  generating an order for the transaction types of the priority level, from first to last;
  for each transaction type of the priority level, from first to last, until the identified transaction server is assigned to process a transaction of a selected type:
    determining whether assigning the identified transaction server to a transaction of the transaction type is necessary to meet the service level goal for the transaction type; and
    if it is determined that assigning the identified transaction server to a transaction of the transaction type is necessary to meet the service level goal for the transaction type, assigning the identified transaction server to process a transaction of the transaction type.

9. The method of claim 8 wherein the generating step generates an order reflecting the extent to which the service level goals of the transaction types of the priority level presently satisfied.

10. The method of claim 8 wherein the generating step generates an order for the transaction types different from the order generated by an immediately preceding performance of the generating step.

11. A computer-readable medium whose contents cause a computer system to distribute transaction servers to process transactions of a plurality of different types, the transaction types being organized into a plurality of priority levels ordered from highest to lowest, each priority level having one or more transaction types, each transaction type further having a service level goal reflecting the level of service sought for transactions of the transaction type, by performing the steps of:
  identifying transaction servers when they become available to process transactions;
  for each identified transaction server, in response to the identification of the transaction server:
    for each priority level, from the highest priority level to the lowest priority level, until the identified transaction server is assigned to process a transaction of a selected type:
      determining whether assigning the identified transaction server to a transaction of any of the transaction types of the priority level is necessary to meet the service level goal for that transaction type;
      if it is determined that assigning the identified transaction server to a transaction of any of the transaction types of the priority level is necessary to meet the service level goal for that transaction type, assigning the identified transaction server to process a transaction of one of the transaction types of the priority level; and
    after the assigned transaction server has completed processing of the transaction to which it was assigned, reidentifying the assigned transaction server as being available to process transactions.

12. The computer-readable medium of claim 11 wherein contents of the computer-readable medium further cause the computer system to perform the steps of, as part of the determining and assigning steps:
  generating an order for the transaction types of the priority level, from first to last;
  for each transaction type of the priority level, from first to last, until the identified transaction server is assigned to process a transaction:
    determining whether assigning the identified transaction server to a transaction of the transaction type is necessary to meet the service level goal for the transaction type; and
    if it is determined that assigning the identified transaction server to a transaction of the transaction type is necessary to meet the service level goal for the transaction type, assigning the identified transaction server to process a transaction of the transaction type.

13. An apparatus for distributing transaction servers to process transactions of a plurality of different types, the transaction types being organized into a plurality of priority levels ordered from highest to lowest, each priority level having one or more transaction types, the apparatus comprising:
  a service level goal attribution subsystem for attributing a service level goal to each transaction type that reflects the level of service sought for transactions of this type;
  an identification subsystem that identifies transaction servers when they become available to process transactions; and
  a transaction server distribution subsystem that, in response to each transaction server identification by the identification subsystem, assigns the identified transaction server to process a transaction of a type that needs an additional transaction server to meet its service level goal, and whose priority level is at least as high as that of any other transaction type that needs an additional transaction server to meet its service level goal,
the identification subsystem reidentifying assigned transaction servers when they complete processing of the transactions to which they were assigned.

14. A computer memory containing a transaction server allocation data structure usable to allocate an available transaction server to processing one of a plurality of transaction types, the data structure comprising, for each transaction type:
  an indication of the priority of transactions of the transaction type relative to the priorities of transactions of other transaction types; and an indication of a service level goal reflecting the level of service sought for transactions of the transaction type, such that the data structure may be used to allocate an available transaction server by, for each transaction type, in descending order of the priorities indicated for the transactions of the transaction types, determining whether the available transaction server is needed in order to meet the service level goal indicated for the transaction type, and assigning the available transaction server to the highest priority transaction type for which the available transaction server is determined to be needed.

15. The computer memory of claim 14 wherein at least one pair of priority indications contained in the data structure indicate the same level of priority.

16. The computer memory of claim 14 wherein at least a portion of the service level goal indications indicate a service level goal specifying a target rate at which transactions of the transaction type are to be assigned to available transaction servers.

17. The computer memory of claim 14 wherein at least a portion of the service level goal indications indicate a service level goal specifying a target minimum amount of time in which transactions of the transaction type are to be assigned to available transaction servers.

18. The computer memory of claim 14 wherein at least a portion of the service level goal indications indicate a service level goal specifying a target rate at which transactions of the transaction type are to be completed by the available transaction servers.

19. The computer memory of claim 14 wherein at least a portion of the service level goal indications indicate a service level goal specifying a target maximum amount of time in which processing of transactions of the transaction type are to be completed by the available transaction servers.

20. A method in a computer system for distributing available transaction servers among a plurality of transaction processing applications each having the same priority, each application further having a service level goal indicating the service level sought for the application, the method comprising the steps of, when a transaction server becomes available:

establishing an order for the applications, from highest to lowest;

for each application, in the established order, until the available transaction server is assigned to an application;

offering the available transaction server to the application;

under the control of the application, determining whether the available transaction server is needed by the application in order for the application to meet its service level goal; and if it is determined that the available transaction server is needed by the application in order for the application to meet its service level goal, assigning the available transaction server to the application, such that each available transaction server is assigned to the application that is highest in the established order that needs the available transaction server in order to meet its service goal.

21. The method of claim 20, further comprising the step of, before the establishing step, determining a current service level of each application that reflects the performance of the application, and wherein the establishing step establishes an order based upon a comparison of current service level to the service level goal for each application.

22. The method of claim 20, further comprising the step of, before establishing the step, determining an expected service level of each application that reflects the projected future performance of the application, and wherein the establishing step establishes an order based upon a comparison of the expected service level to the service level goal for each application.

23. The method of claim 20 wherein each iteration of the establishing step establishes an order that is rotated one position from the order established from the previous iteration of the establishing step, such that the applications each have a comparable opportunity to obtain available transaction servers.

24. The method of claim 20 wherein a selected one of the applications has a server qualification standard, and wherein only a portion of the transaction servers have qualification credentials satisfying the server qualification standard, and wherein the determining step for the selected application includes the step of determining whether the available transaction server has qualification credentials satisfying the server qualification standard.

25. A computer-readable medium whose contents cause a computer system to distribute available transaction servers among a plurality of transaction processing applications each having the same priority, each application further having a service level goal indicating the service level sought for the application, by performing the steps of, when a transaction server becomes available:

establishing an order for the applications, from highest to lowest;

for each application, in the established order, until the available transaction server is assigned to an application;

offering the available transaction server to the application;

under the control of the application, determining whether the available transaction server is needed by the application in order for the application to meet its service level goal; and if it is determined that the available transaction server is needed by the application in order for the application to meet its service level goal, assigning the available transaction server to the application.

26. The computer-readable medium of claim 25 wherein the contents of the computer readable medium further cause the computer system to perform the step of, before the establishing step, determining a current service level of each application that reflects the performance of the application, and wherein the establishing step establishes an order based upon a comparison of current service level to the service level goal for each application.

27. The computer readable medium of claim 25, further comprising the step of, before establishing the step, determining an expected service level of each application that reflects the projected future performance of the application, and wherein the establishing step establishes an order based upon a comparison of the expected service level to the service level goal for each application.

28. The computer-readable medium of claim 25 wherein each iteration of the establishing step establishes an order that is rotated one position from the order established from the previous iteration of the establishing step, such that the applications each have a comparable opportunity to obtain available transaction servers.

29. The computer readable medium of claim 25 wherein a selected one of the applications has a server qualification standard, and wherein only a portion of the transaction servers have qualification credentials satisfying the server qualification standard, and wherein the determining step for the selected application includes the step of determining whether the available transaction server has qualification credentials satisfying the server qualification standard.

30. A method in a computer system for maintaining a target service level of a transaction processing application that uses reassignable transaction servers to process transactions that arrive from a transaction source, the method comprising the steps of:

receiving an offer of an additional transaction server;

determining the rate at which transactions are arriving from the transaction source;

determining the number of transactions that have arrived from the transaction source whose processing has not been assigned to a transaction server;

determining the rate at which processing of transactions is being completed; and based on the target service level, the determined rate at which transactions are arriving from the transaction source, the determined number of transactions that have arrived from the transaction source whose processing has not been assigned to a transaction server, and the rate at which processing of transactions is being completed, determining whether the offered additional transaction server is needed to satisfy the target service level; and accepting the offered additional transaction server to enable the offered additional transaction server to be assigned to a transaction of the application only if it is determined that the offered additional transaction server is needed to satisfy the target service level.

31. The method of claim 30 wherein the application has an idle/reserved server queue of additional transaction servers that have not yet been accepted to process transactions, and wherein the accepting step includes the step of adding the offered additional transaction server to the idle/reserved server queue.

32. The method of claim 30 wherein the application has a transaction queue of transactions to whose processing no transaction server has yet been assigned, and wherein the accepting step includes the step of assigning the offered additional transaction server to process a particular transaction in the transaction queue.

33. The method of claim 30 wherein the step of determining whether the offered additional transaction server is needed utilizes a quantitative model of transaction processing within the application to determine whether the offered additional transaction server is needed to satisfy the target service level.

34. The method of claim 30 wherein the step of determining whether the offered transaction server is needed utilizes a mathematical formula modeling transaction processing within the application to determine whether the offered additional transaction server is needed to satisfy the target service level.

35. The method of claim 30 wherein the step of determining whether the offered additional transaction server is needed utilizes a data structure indicating, for a plurality of combinations of the rate at which transactions are arriving from the transaction source, the determined number of transactions that have arrived from the transaction source whose processing has not been assigned to a transaction server, and the determined rate at which processing of transactions is being completed, whether an offered additional transaction server is needed to satisfy the target service level.

36. A computer-readable medium whose contents cause a computer system to maintain a target service level of a transaction processing application that uses reassignable transaction servers to process transactions that arrive from a transaction source by performing the steps of:

receiving an offer of an additional transaction server;

determining the rate at which transactions are arriving from the transaction source;

determining the number of transactions that have arrived from the transaction source whose processing has not been assigned to a transaction server;

determining the rate at which processing of transactions is being completed; and based on the target service level, the rate at which transactions are arriving from the transaction source, the determined number of transactions that have arrived from the transaction source whose processing has not been assigned to a transaction server, and the determined rate at which processing of transactions is being completed, determining whether the offered transaction server is needed to satisfy the target service level; and accepting the offer only if it is determined that the offered transaction server is needed to satisfy the service level.

37. A method in a computer system for maintaining a target service level of a transaction processing application that uses reassignable transaction servers to process transactions that arrive from a transaction source, the method comprising the steps of:

receiving an offer of an additional transaction server;

determining a current service level reflecting the current transaction processing performance of the application;

comparing the determined current service level to the service level goal; and based on the result of the comparing step, determining whether the offered transaction server is needed to satisfy the service level goal; and accepting the offer only if it is determined that the offered transaction server is needed to satisfy the service level goal.

38. The method of claim 37 wherein the application has an idle/reserved server queue of transaction servers that have not yet been assigned to process a transaction, and wherein the accepting step includes the step of adding the offered transaction server to the idle/reserved server queue.

39. The method of claim 37 wherein the application has a transaction queue of transactions to whose processing no transaction server has yet been assigned, and wherein the accepting step includes the step of assigning the offered transaction server to process a particular transaction in the transaction queue.

40. A method in a computer system for distributing reassignable transaction processing servers among a plurality of transaction processing applications, the method comprising the steps of:

defining for a first application of the plurality a transaction assignment service level goal reflecting the performance sought for the first application in assigning transactions to a server;

defining for a second application of the plurality a transaction completion service level goal reflecting the performance sought for the second application in completing the processing transactions;

when a server is available for distribution:

assessing the demand for an additional server by the first application based on the transaction assignment service level goal defined for the first application;

assessing the demand for an additional server by the second application based on the transaction completion service level goal defined for the second application;

comparing the assessments; and based upon the results of the comparing step, selecting between the first and second application for distribution of the available server.

41. The method of claim 40 wherein the first application is for processing telephone call transactions, and wherein the step of defining a transaction assignment level goal defines a transaction assignment service level goal reflecting the performance sought in assigning telephone call transactions to servers.

42. The method of claim 41 wherein the second application is for processing transactions other than telephone calls, and wherein the step of defining a transaction completion service goal defines a transaction completion service goal reflecting the performance sought in assigning transactions other than telephone calls to servers.

43. A computer-readable medium whose contents cause a computer system to distribute reassignable transaction processing servers among a plurality of transaction processing applications by performing the steps of:

defining for a first application of the plurality a transaction assignment service level goal;

defining for a second application of the plurality a transaction completion service level goal;

when a server is available for distribution:

assessing the demand for an additional server by the first application based on the transaction assignment service level goal defined for the first application;

assessing the demand for an additional server by the second application based on the transaction completion service level goal defined for the second application;

comparing the assessments; and based upon the results of the comparing step, selecting between the first and second application for distribution of the available server.

* * * * *